Aug. 25, 1964

H. E. WIDDOWS 3,145,956

PARACHUTE DEPLOYMENT CONTROL ASSEMBLY

Filed Oct. 8, 1963

INVENTOR.
HAROLD E. WIDDOWS
BY
ATTORNEY
AGENT

Aug. 25, 1964 H. E. WIDDOWS 3,145,956
PARACHUTE DEPLOYMENT CONTROL ASSEMBLY
Filed Oct. 8, 1963 5 Sheets-Sheet 2

INVENTOR.
HAROLD E. WIDDOWS
BY
ATTORNEY
AGENT

INVENTOR.
HAROLD E. WIDDOWS

Aug. 25, 1964   H. E. WIDDOWS   3,145,956
PARACHUTE DEPLOYMENT CONTROL ASSEMBLY
Filed Oct. 8, 1963   5 Sheets-Sheet 4

INVENTOR.
HAROLD E. WIDDOWS
BY
ATTORNEY
Richard J. Killoren
AGENT

United States Patent Office 3,145,956
Patented Aug. 25, 1964

3,145,956
PARACHUTE DEPLOYMENT CONTROL ASSEMBLY
Harold E. Widdows, Albuquerque, N. Mex., assignor, by mesne assignments, to the United States of America as represented by the United States Atomic Energy Commission
Filed Oct. 8, 1963, Ser. No. 314,824
5 Claims. (Cl. 244—147)

This invention relates to a parachute canopy deployment control assembly for reducing damage to the parachute under high-speed deployment.

One object of the invention is to provide a parachute canopy deployment assembly which will contain the parachute canopy until after the impact load occurs.

Another object of the invention is to provide a parachute canopy deployment assembly which will reduce the opening shock loads on the canopy.

A further object of the invention is to provide a parachute deployment assembly which will prevent twisting of the parachute canopy in the deployment bag.

These and other objects will be more fully understood from the following detailed description taken with the drawing wherein.

A parachute which is opened abruptly in an environment of high dynamic pressure suffers dynamic loads which are quite often of such magnitude as to cause severe damage or complete failure of the parachute.

Prior methods have failed to give satisfactory results because of poor containment during deployment due to the practice of cutting the pack lacing cords for the entire length of the deployment bag at the start of deployment leaving the canopy retained only by the locking flaps which allowed the canopy to be exposed to high velocity air prior to snatch load thereby resulting in disorderly deployment sequence and high snatch loads. Also the tying of a line around the entire canopy and then tying this line to the pack loops causes excessive opening shock loads on the parachute system and permits the canopy to twist in the deployment bag.

According to this invention, the line compartment lacings are cut at the start of deployment and the canopy compartment remains laced until the line stretch which occurs just prior to unlocking the pack locking flaps. The lacings for the canopy compartment are cut when the suspension lines are substantially fully extended by lanyards connected to the suspension lines and attached to the canopy compartment lace cutting knives.

To provide good deployment control, canopy tie loops are stitched on all of the radial ribbons on the outside of the canopy. The canopy tie material is run through these loops and tied to the deployment bag tie loops. One-fourth of the canopy ties is tied to a tie loop of each pack leaf.

Figure 1:
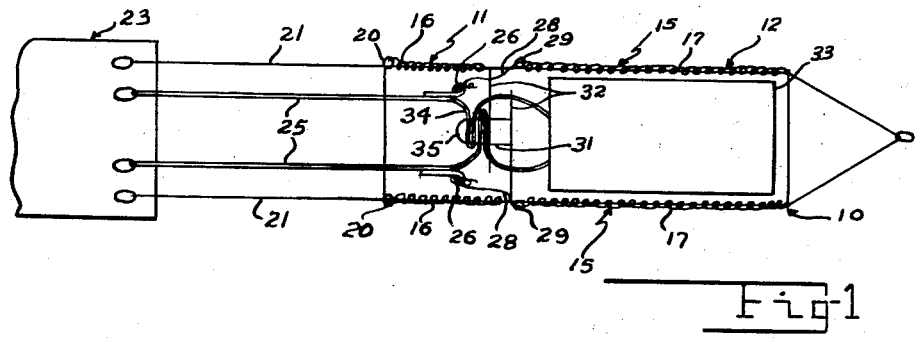
FIG. 1 is a schematic illustration of a parachute deployment bag for showing the operating sequence during deployment.
Figure 3:
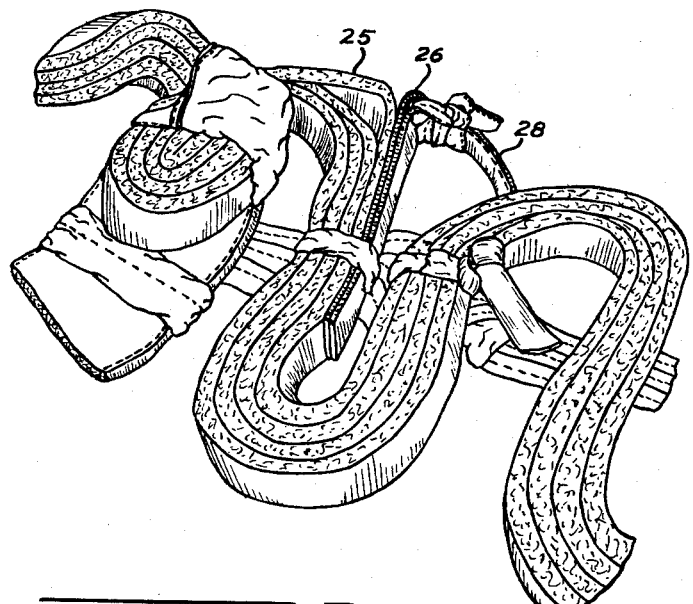
FIG. 3 shows the loop attached to one of the suspension lines to which the canopy compartment cutting knife lanyard is attached.
Figure 2:
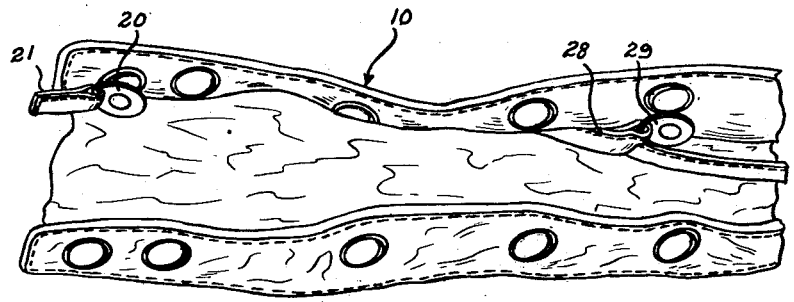
FIG. 2 shows the line compartment cutting knife and the canopy compartment cutting knife for the device of FIG. 1.

Referring now to FIG. 1 of the drawing, reference number 10 indicates a deployment bag having a line compartment 11 and a canopy compartment 12. Two of the four deployment bag lacings are illustrated at 15 with the line compartment lacing indicated at 16 and the canopy compartment lacing indicated at 17. The line compartment lacing 16 is cut by cutting knives 20, shown in greater detail in FIG. 2, which are attached to cutter lanyards 21, which in turn are attached to the vehicle indicated generally at 23. The suspension lines 25 also attached to the vehicle 23, have loops 26, shown in greater detail in FIG. 3, attached thereto. Lanyards 28 are connected between loops 26 and cutting knives 29. The suspension lines 25 are folded through a loop lock 31 on locking flaps 32 and are then connected to the canopy indicated generally at 33 as in prior art devices.

Figure 6:
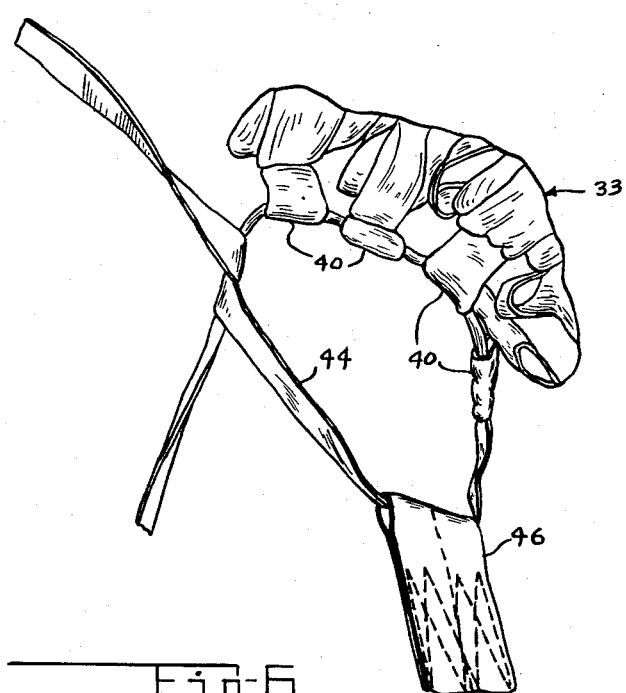
FIG. 6 shows one of the canopy ties in the canopy tie loops and the deployment bag tie loop.
Figure 4:
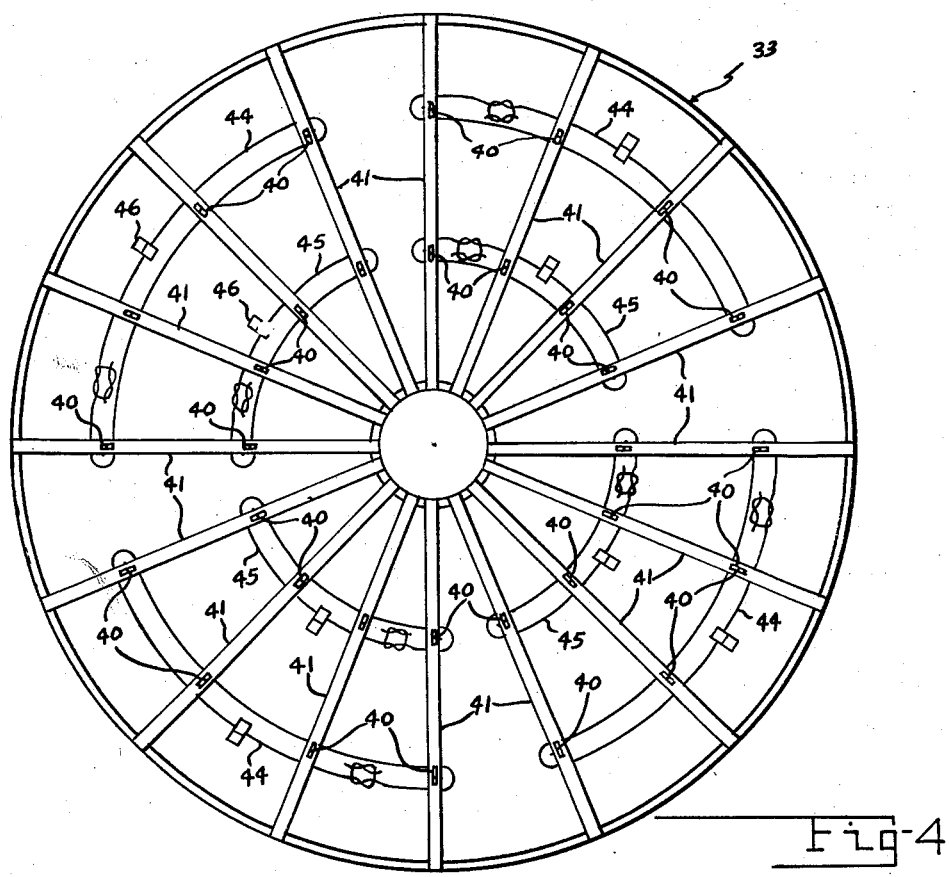
FIG. 4 is a schematic illustration showing the tying arrangement for the parachute canopy.
Figure 5:
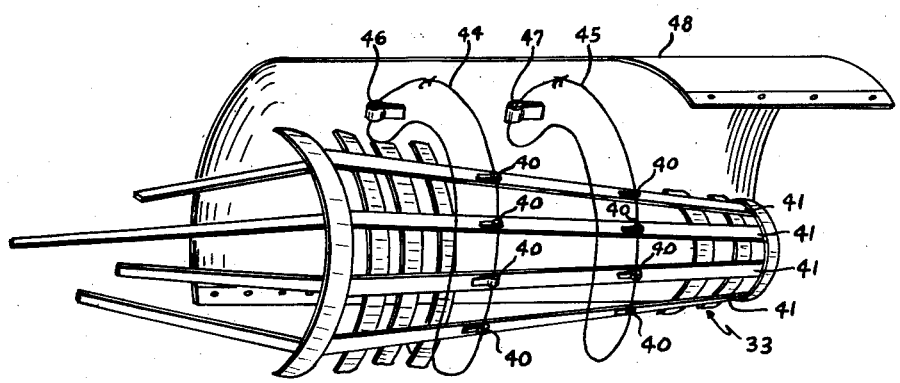
FIG. 5 is a schematic illustration showing the tying arrangement for one of the four sections of canopy.
Figure 7:
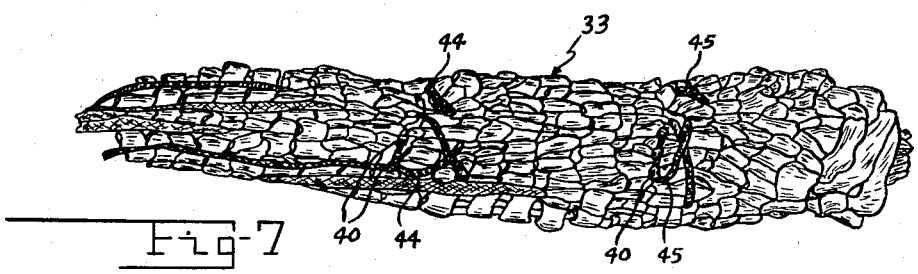
FIG. 7 shows a parachute canopy with the ties tied through the tie loops on the canopy in preparation for insertion into the deployment bag.
Figure 8:
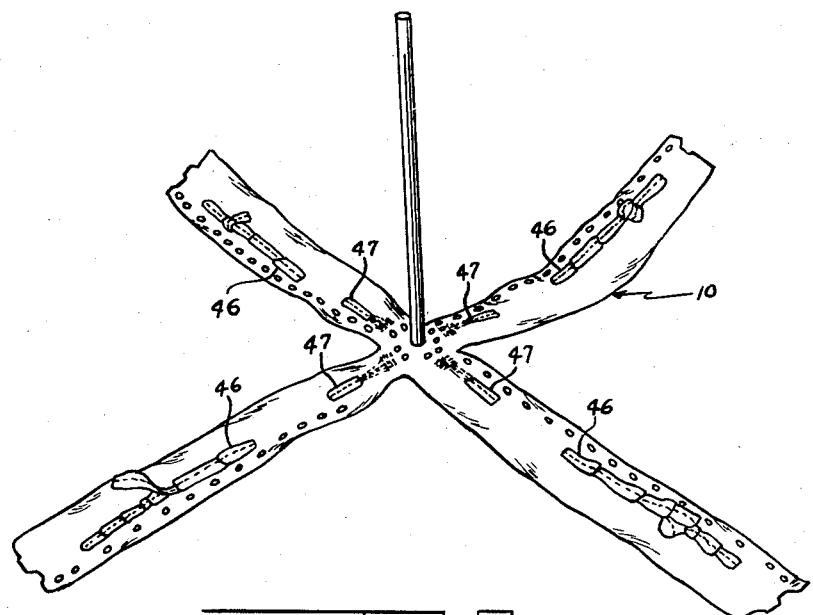
FIG. 8 shows a four-lap deployment bag for use in the assembly of the invention.

The canopy is divided into fourths and is tied to the deployment bag leaves as shown schematically in FIG. 4 and FIG. 5. Two tie loops 40 are secured to each radial ribbon 41 of the parachute canopy 33. Canopy ties 44 and 45 are passed through the tie loops 40 on the radial ribbons and through tie loops 46 and 47 on each pack leaf 48. The canopy ties for one device tested was 400 pound test ribbon; however, the strength required for the ties is determined by the particular conditions present and by the particular parachute used. While the illustration of FIGS. 4 and 5 show the overall tying system used, the actual appearance of the loops when tied will be as shown in FIGS. 6 and 7. The tie loops on the deployment bag pack leaves are as shown in FIG. 8.

The pilot chute system forms no part of this invention and may be the same as in prior art devices.

Figure 9:
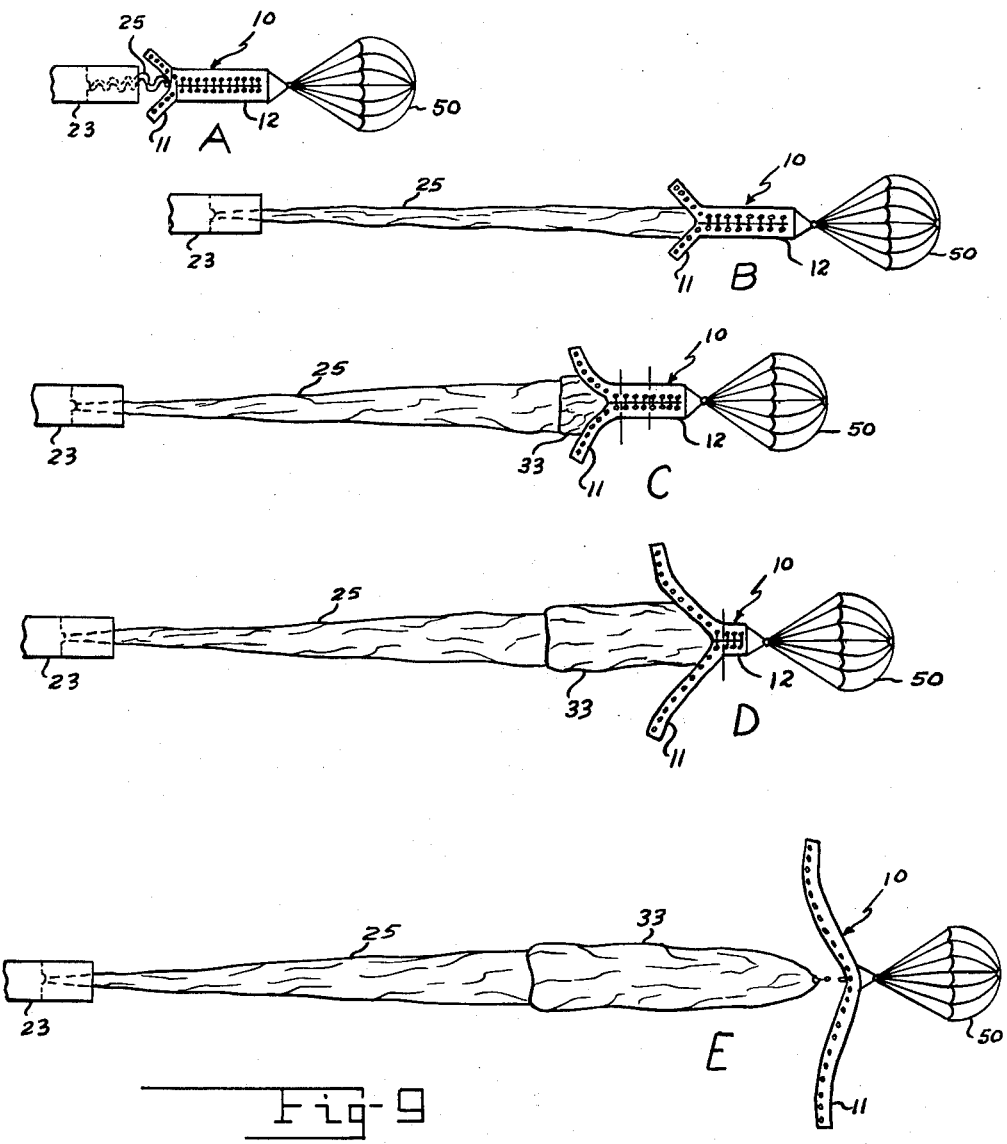
FIG. 9 shows the parachute opening sequence for the device of the invention.

In the operation of the device of the invention, FIG. 9a shows the deployment bag just after it has emerged from the vehicle and the pilot chute 50 is fully opened. The lanyards 21 shown schematically in FIG. 1 have caused the cutting knives 20 to cut the line compartment lacings 16 to permit extension of suspension lines 25. The description of the operation with reference to FIG. 1 shows only one section of the deployment bag; however, the operation of the other sections is identical.

FIG. 9b shows the suspension lines 25 fully extended and, at this time, the lanyards 28 connected to loops 26 pull on cutting knives 29 to cut the canopy compartment lacings 15. Suspension line loops 34 are also pulled free of locking flap loops 35 to permit opening of the canopy compartment in the usual manner. The canopy 33 is then partially deployed as shown in FIG. 9c. The ties 44 keep the remainder of the canopy from deploying until opening force of the parachute breaks this first row of ties. After the ties 44 break, the portion of the canopy, between ties 44 and 45, is deployed as shown in FIG. 9d. At this time, the second row of ties 45 are broken permitting the remaining portion of the canopy to deploy as shown in FIG. 9e. The parachute then fully opens in the normal manner.

While the deployment bag has been shown with four leaves, other deployment bags may have another number of leaves, for example, three, in which case the canopy would be tied in three sections. Also, though the suspension lines are described as being connected to a vehicle, it is obvious that they could be connected to other type loads. There is thus provided a parachute canopy deployment control assembly which will reduce damage to the parachute under high-speed deployment.

While certain specific embodiments have been described, it is obvious that numerous changes may be made without departing from the general principle and scope of the invention.

I claim:

1. A parachute canopy deployment control assembly capable of being ejected from a high-speed vehicle, comprising: a plural-panel deployment bag having a canopy compartment and a suspension line compartment separated by a plurality of locking flaps; a first set of lacing means for interconnecting said panels in the region of said canopy compartment, a second set of lacing means for interconnecting said panels in the region of said suspension line compartment; a parachute canopy having a plurality of radial ribbons, located within said canopy compartment; breakable means for tying a portion of said radial ribbons to each panel of said deployment bag; a plurality of suspension lines connected to the parachute canopy; means including said suspension lines for retaining said locking flaps until said suspension lines are substantially fully extended; means connected to certain of said suspension lines for cutting said first set of lacings when said suspension lines are substantially fully extended; and means for cutting said second set of lacings when said parachute assembly is ejected from the vehicle.

2. A parachute canopy deployment control assembly capable of being ejected from a high-speed vehicle, comprising: a plural-gore parachute canopy having a plurality of radial ribbons; a plurality of suspension lines connected to said radial ribbons; each of said radial ribbons having at least two radially spaced tie loops attached thereto; said tie loops being located in a plurality of circumferential rows; a plural-panel deployment bag having a plurality of tie loops on each panel; a plurality of breakable tie means, each passing through an equal number of tie loops on said radial ribbons and one tie loop on said development bag panels, for securing portions of said canopy to corresponding portions of said deployment bag; lacing means, interconnecting a first portion of said deployment bag panels for securing said canopy within a first portion of said deployment bag; means, connected to said suspension lines, for cutting said lacings when said suspension lines are substantially fully extended; a second lacing means, interconnecting a second portion of said deployment bag, for securing said suspension lines within a second portion of said deployment bag; and means adapted to be connected to the parachute load for cutting said second lacing means when the parachute assembly is ejected from the vehicle.

3. A parachute canopy deployment control assembly capable of being ejected from a high-speed vehicle, comprising: a plural-gore parachute canopy having a plurality of radial ribbons; a plurality of suspension lines connected to said radial ribbons; each of said radial ribbons having at least two radially spaced tie loops attached thereto; a plural-panel deployment bag having a plurality of tie loops on each panel; a plurality of breakable tie means, each passing through an equal number of tie loops on said ribbons and one tie loop on said deployment bag panels, for securing an equal number of ribbons of said canopy to each panel in a first portion of said deployment bag; a first set of lacing means, for interconnecting the deployment bag panels in said first portion of the deployment bag; means, connected to said suspension lines, for cutting said lacing means when said suspension lines are fully extended; a second set of lacing means, interconnecting the deployment bag panels in a second portion of said deployment bag, for securing said suspension lines within said second portion; and means adapted to be connected to the parachute load for cutting said second lacing means when the parachute assembly is ejected from the vehicle.

4. A parachute canopy deployment control assembly capable of being ejected from a high-speed vehicle, comprising: a plural-panel deployment bag having a canopy compartment and a suspension line compartment separated by a plurality of locking flaps; a first set of lacing means for interconnecting said panels in the region of said canopy compartment; a second set of lacing means for interconnecting said panels in the region of said suspension line compartment; a parachute canopy having a plurality of radial ribbons, located within said canopy compartment; a plurality of tie loops on said parachute canopy; said tie loops being located in a plurality of circumferential rows with one in each row being attached to each of said radial ribbons; a plurality of tie loops on each of the panels of said deployment bag; a plurality of breakable tie means for tying a portion of the tie loops in each of said circumferential rows to corresponding tie loops on said panels; a first set of cutting knives surrounding each lace in said first set of lacings; a plurality of suspension lines connected to the parachute canopy; means including said suspension lines for retaining said locking flaps until said suspension lines are substantially fully extended; a lanyard connected between certain of said suspension lines and said cutting knives whereby said first set of lacings are cut when said suspension lines are fully extended; a second set of cutting knives with one surrounding each lace in said second set of lacings and means for operating said second set of cutting knives when said parachute assembly is ejected.

5. A parachute canopy deployment control assembly capable of being ejected from a high-speed vehicle, comprising: a four-panel deployment bag having a canopy compartment and a suspension line compartment separated by a plurality of locking flaps; a first set of lacing means for interconnecting said panels in the region of said canopy compartment; a second set of lacing means for interconnecting said panels in the region of said suspension line compartment; a parachute canopy having sixteen radial ribbons, located within said canopy compartment; two tie loops on each of said radial ribbons; said tie loops being located in two circumferential rows with one in each row being attached to each of said radial ribbons; a plurality of tie loops on each of the panels of said deployment bag; a breakable tie means for tying four of the tie loops in each of said circumferential rows to a corresponding tie loop on each of said deployment bag panels, at least one cutting knife surrounding each lace in said first set of lacings; a plurality of suspension lines connected to the parachute canopy; a lanyard connected between certain of said suspension lines and each of said cutting knives whereby said first set of lacings are cut when said suspension lines are substantially fully extended; a cutting knife surrounding each lace in said second set of lacings; means for operating said cutting knives surrounding said second set of lacings when said parachute assembly is ejected; and means including said suspension lines for retaining said locking flaps until said suspension lines are substantially fully extended.

References Cited in the file of this patent

UNITED STATES PATENTS 2,702,679     Culver _____ Feb. 22, 1955